United States Patent [19]

Ogoe et al.

[11] Patent Number: 4,587,310

[45] Date of Patent: May 6, 1986

[54] CARBONATE POLYMES CONTAINING A POLYETHER POLYOL METAL SALT COMPLEX

[75] Inventors: Samual A. Ogoe, Angleton; Kevin F. Dick, Lake Jackson, both of Tex.

[73] Assignee: The Dow Chemical Company, Midland, Mich.

[21] Appl. No.: 740,666

[22] Filed: Jun. 3, 1985

[51] Int. Cl.$^4$ .............................................. C08F 283/02
[52] U.S. Cl. .................................... 525/462; 524/377; 524/611; 525/409; 525/470
[58] Field of Search ............... 525/462, 439, 409, 470; 524/439, 377, 611

[56] References Cited

U.S. PATENT DOCUMENTS 4,200,701  4/1980  Wetton et al. ................... 528/403 X
4,439,566  3/1984  Thomas ................................ 524/108

OTHER PUBLICATIONS

Lundberg et al., Journal of Polymer Science: Part A-1, vol 4, pp. 1563–1577 (1966).

*Primary Examiner*—Theodore E. Pertilla

[57] ABSTRACT

Ignition resistant carbonate polymers are made by incorporating a metal salt complex of polyether polyols into the polymer. The carbonate polymers are transparent with low haze and still have high ignition resistance. The ignition resistance can be improved by the addition aromatic compound.

20 Claims, No Drawings

CARBONATE POLYMES CONTAINING A POLYETHER POLYOL METAL SALT COMPLEX

BACKGROUND OF THE INVENTION

This invention relates to ignition resistant carbonate polymer compositions containing one or more polyether polyol metal salt complexes.

Polyether polyols are well known from Polyurethanes Chemistry and Technology, Part I by J. H. Saunders and K. C. Frisch (1962) pages 32–43.

Metal salt complexes of these polyether polyols are known from U.S. Pat. No. 4,200,701 and Lundberg et al J. of Polymer Science Part A-1 Vol. 4, pgs. 1563–1577 (1966).

Ignition resistant polycarbonates made with crown ether salts are known from U.S. Pat. No. 4,439,566. However, these crown ethers have the disadvantage that they are too expensive and toxic to be of any practical value.

SUMMARY OF THE INVENTION

The invention is an ignition resistant polymeric composition containing a carbonate polymer such as a homopolycarbonate, polyester polycarbonate and blends or mixtures thereof combined with a polyether polyol metal salt complex in an amount effective to give a significant increase in ignition resistance without materially changing the transparency.

The metal cation of the salt can be an alkali or alkaline earth metal with the sodium or potassium metal salts being preferred.

The anionic part of the salt can be any one of a vast number of halogen containing anions

DETAILED DESCRIPTION OF THE INVENTION

The carbonate polymers employed in the present invention are aromatic carbonate polymers such as the trityl diol carbonates described in U.S. Pat. No. 3,036,036, 3,036,037, 3,036,038 and 3,036,039, polycarbonates of bis(ar-hydroxyphenyl)-alkylidenes (often called bisphenol-A type diols) including their aromatically and aliphatically substituted derivatives such as disclosed in U.S. Pat. Nos. 2,999,835, 3,038,365 and 3,334,154, and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121, 4,287,787, 4,156,069, 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The ignition resistant carbonate polymer compositions of the present invention are suitably prepared by combining the carbonate polymer with an effective amount of the polyether polyol metal salt complexes using any of a variety of blending procedures conventionally employed for incorporating additives into carbonate polymer resins. For example, dry particulates of the carbonate polymer and the complex can be blended and the resulting blend extruded into the desired shape. By "effective amount" is meant that amount of the additive components which is sufficient to provide improved and/or a significant increase in ignition resistant character to the carbonate polymer with which it is blended.

If greater ignition resistance is desired, the above polycarbonate/salt complex can be improved by the incorporation therein of a monomeric or polymeric halogenated aromatic compound.

Useful monomeric bromo and/or chloro halogenated aromatic compounds are halogenated diphenyl sulfone, diphenyl, diphenyl oxide, benzene, phthalimide, and mixtures thereof. These compounds can be mono or poly halogenated with bromine or chlorine atoms. Bromide compounds are preferred since they cause less degradation of the polycarbonate and appear to be more efficient as ignition retardants.

Useful polymeric bromo and/or chloro halogenated aromatic compounds are oligomeric and polymeric polycarbonates derived from phosgene and a halogenated bisphenol A with or without bisphenol A. Thus, homopolymers and copolymers are useful in this invention. These oligomeric and polymeric halogenated polycarbonates are preferred since the final composition is transparent with little haze.

The amount of the halogenated organic compound used herein is not critical provided that the final halogen content of the polymer composition is in the range from about 0.01 to 10 percent by weight and preferably from about 0.1 to about 1.0 percent by weight. It is to be understood that one can use relatively small amount of a highly halogenated aromatic compound or a relatively large amount of a sparsely halogenated compound to achieve the above desired ranges.

While any amount of the polyol complex that imparts to the carbonate polymer an improved ignition resistance is suitable, preferred amounts of the additive are in the range from about 0.001 to about 10 percent, especially from about 0.005 to about 2 weight percent based on the weight of the carbonate polymer.

The polyether polyols useful in this invention are well known from the Encyclopedia of Chemical Technology Vol. 18 (1982), pages 616–645 which are incorporated by reference herein. Examples of useful polyether polyols are block or random polyols prepared from ethylene oxide, propylene oxide, or butylene oxide and having a weight average molecular weight in the range from about 1000 to about 50,000. These polyols are known commercially as the Voranols (a trademark of The Dow Chemical Company).

A preferred class of useful polyether polyols are the homopolymers of ethylene oxide or propylene oxide having a molecular weight range from about 1000 to about 10,000.

The metal salts useful in this invention are the alkali metal or alkaline earth metal salts of halogen containing anion such as $Cl^-$, $Br^-$, $I^-$, $BF_4^-$, $TiF_6^{-2}$, $SbF_6^-$, $SiF_6^{-2}$, and $ZrF_6^{-2}$. The preferred metal salts are those containing alkali metals such as sodium and potassium and halide ions such as chlorine and bromine.

In addition to the aforementioned ignition resistant additives, other additives can be included in the carbonate polymer composition of the present invention such as fillers (i.e., a tetrafluoroethylene polymer or glass fibers), pigments, dyes, antioxidants, heat stabilizers, ultraviolet light absorbers, mold release agents and other additives commonly employed in carbonate polymer compositions.

The following examples are given to further illustrate the invention and should not be construed as limiting its scope. In the following examples, all parts and percentages are by weight unless otherwise indicated.

PREPARATION OF THE POLYOL-METAL SALT COMPLEX

Sodium bromide (5 grams) was added to 5 grams of methyl alcohol with shaking. After a complete solution was obtained, 5 grams of Voranol 4701 (polyether polyol made by the Dow Chemical Company) was added with shaking. After a clear solution was obtained, 5 grams of water were added and the mixture was placed in a mechanical shaker overnight.

EXAMPLE 1

A polycarbonate formulation incorporating 0.03% of the sodium bromide-polyol complex such that the final polymer blend contains 0.001% sodium is prepared by mixing 0.6 gram of the complex with 2000 grams of a heat stabilized polycarbonate of about 31,000 weight average molecular weight for about 5 minutes on a Red Devil shaker. The blended sample is extruded into pellets on a vented twin screw extruder at 550° F. The extruded sample is injection molded at 575° F. into ⅛ inch bars and disks for the measurements of ignition resistance using the standard UL-94 test procedure. Optical measurements are made using a Hunter Lab D-25 color difference meter. The polycarbonate was stabilized by the addition of a diphosphonite stabilizer P-EPQ from Sandoz (U.S. Pat. No. 3,825,629) and 0.05% by weight of a hindered phenolic Irganox 1076 from Geigy Chemical Corp. (U.S. Pat. No. 3,330,859).

EXAMPLE 2

The procedure of example 1 is repeated using 0.05% of the NaBr-polyol complex.

Control 1

The heat stabilized base polycarbonate without the addition of the NaBr-polyol complex.

Control 2

The procedure of example 1 is repeated except that 0.03% of sodium bromide crystals are added without the polyol.

Control 3

The procedure of example 1 is repeated except that 0.03% of the polyol only is added.

Control 4

The procedure of example 1 is repeated except that 0.03% of the polyol in methanol is added.

TABLE I
FLAMMABILITY TEST RESULTS

UL-94 Test ⅛" Transparent

| Sample | $T_1$ Sec.* | $T_2$ Sec* | Avg T Sec | # Drips | Rating |
|---|---|---|---|---|---|
| Control 1 Heat Stabilized Polymer (C) | 15.1 | 30.4 | 4.5 | 5/5 | V-2 |
| Control 2 (C) + 0.03% Solid sodium bromide. | 10.6 | 28.1 | 3.9 | 3/5 | V-2 |
| Control 3 (C) + 0.03% polyol | 91.2 | 27.3 | 11.9 | 5/5 | V-2 |
| Control 4 (C) + 0.03% polyol + methanol | 82.8 | 15.5 | 9.8 | 5/5 | V-2 |
| Example 1 (C) + 0.03% NaBr-polyol system. | 7.4 | 8.3 | 1.6 | 0/5 | V-0 |
| Example 2 (C) + 0.05% NaBr-polyol system. | 7.3 | 12.3 | 2.0 | 0/5 | V-0 |

*Total flame time in seconds for the 5 bars burned.

TABLE II
OPTICAL TEST RESULTS FOR CONTROLS 1-4, EXAMPLES 1 & 2

| Sample | YI | % T | % H |
|---|---|---|---|
| Control 1 | 2.9 | 89.0 | 2.2 |
| Control 2 | 3.0 | 89.0 | 5.0 |
| Control 3 | 2.4 | 90.8 | 1.2 |
| Control 4 | 2.3 | 90.9 | 1.3 |
| Example 1 | 2.6 | 90.8 | 1.7 |
| Example 2 | 2.9 | 90.6 | 1.9 |

YI is the yellowness index
% T is the percent transmittance
% H is the percent haze Table 1 demonstrates that addition of 0.03 to 0.05% of the NaBr-polyol complex to the heat stabilized polycarbonate does modify the flammability properties of the polymer desirably. For instance, examples 1 and 2, which contain 0.03% and 0.05% of the NaBr-polyol complex respectively, show significant reduction in average burn time (Avg T in seconds) with no flaming drips. The two examples are rated V-0 based on the Underwriters Laboratory Bulletin No. 94 (UL-94) ratings. The rest of the samples which do not contain the NaBr-polyol complex are all rated V-2.

Table 2 exemplifies the incorporation of the NaBr-polyol complex into a polycarbonate resin has no adverse effect on the optical properties. Samples with 0.03% and 0.05% of the NaBr-polyol complex exhibit low color (yellowness index), high percent transmittance (%T) and low percent haze (%H). Control 2, which contains 0.03% of the solid NaBr crystals without a polyol added exhibits a significant loss in clarity. The polyol apparently blends the sodium bromide with the polycarbonate and prevents loss of clarity.

EXAMPLES 3-12

Following the above procedures, polyol-metal salt complexes were prepared from various other polyether polyols and blended with a polycarbonate resin. The results are set forth in Tables III and IV. The polyether polyols used such as the Voranol polyols and polyglycols are commercial products of The Dow Chemical Company.

TABLE III
Flammability Test Results

UL-94 Test

| Examples | Avg T sec | # Drips | Rating |
|---|---|---|---|
| 3   0.03% NaBr/Voranol 5815 Complex | 2.2 | 0/5 | V-O |

TABLE III-continued

Flammability Test Results

| Examples | | | Avg T sec | # Drips | UL-94 Test Rating |
|---|---|---|---|---|---|
| 4 | 0.05% | NaBr/Voranol 5815 Complex | 2.5 | 0/5 | V-O |
| 5 | 0.03% | NaBr/Voranol 2741 Complex | 1.6 | 0/5 | V-O |
| 6 | 0.05% | NaBr/Voranol 2741 Complex | 2.0 | 0/5 | V-O |
| 7 | 0.1% | KBR/Voranol 4701 Complex | 3.5 | 0/5 | V-O |
| 8 | 0.5% | KBR/Voranol 4701 Complex | 1.6 | 0/5 | V-O |
| 9 | 0.1% | NaBr/Voranol 4701 Complex | 2.0 | 0/5 | V-O |
| 10 | 0.5% | NaBr/Voranol 4701 Complex | 1.8 | 0.5 | V-O |
| 11 | 0.5% | NaBr/Polyglycol E-8000 Complex | 1.8 | 0/5 | V-O |
| 12 | 0.5% | KBR/Polyglycol E-8000 Complex | 1.9 | 0/5 | V-O |

TABLE IV

Optical Test Results For Examples 3-12

| Examples | YI | % T | % H |
|---|---|---|---|
| 3 | 2.8 | 90.5 | 2.4 |
| 4 | 3.7 | 89.8 | 3.1 |
| 5 | 2.6 | 90.8 | 2.1 |
| 6 | 2.8 | 90.6 | 2.8 |
| 7 | 2.9 | 90.5 | 1.7 |
| 8 | 4.1 | 89.6 | 7.0 |
| 9 | 3.2 | 90.5 | 2.5 |
| 10 | 4.2 | 88.9 | 10.1 |
| 11 | 4.6 | 88.3 | 10.7 |
| 12 | 4.2 | 89.0 | 2.9 |

EXAMPLES 13-18

The procedure of Example 1 was repeated except that various amounts of a commercial tetrabromo bisphenol A oligomer (BC-52 Great Lakes Chemical) having 50 percent by weight of bromine was added to the polycarbonate resin before it was extruded and molded to further improve the ignition resistance or flammability resistance. The results are set forth in Tables V and VI.

TABLE V

Flammability Test Results

| Examples | | | Avg T sec | # Drips | UL-94 Test Rating |
|---|---|---|---|---|---|
| 13 | 0.5% | NaBr/polyglycol E-8000 Complex | 0.8 | 0/5 | V-O |
| | 1.0% | Tetrabromobis-A oligomer | | | |
| 14 | 0.5% | KBR/polyglycol E-8000 Complex | 0.6 | 0/5 | V-O |
| | 1.0% | tetrabromobis-A oligomer | | | |
| 15 | 0.1% | KBR/Voranol 4701 Complex | 1.8 | 0/5 | V-O |
| | 0.6% | Tetrabromobis-A oligomer | | | |
| 16 | 0.5% | KBR/Voranol 4701 Complex | 0.8 | 0/5 | V-O |
| | 1.0% | Tetrabromobis-A oligomer | | | |
| 17 | 0.1% | NaBr/Voranol 4701 Complex | 1.4 | 0/5 | V-O |
| | 0.6% | Tetrabromobis-A oligomer | | | |
| 18 | 0.5% | NaBr/Voranol 4701 Complex | 0.7 | 0/5 | V-O |
| | 1.0% | Tetrabromobis-A oligomer | | | |

TABLE VI

Optical Test Results For Examples 13-18

| Examples | YI | % T | % H |
|---|---|---|---|
| 13 | 4.5 | 88.2 | 10.8 |
| 14 | 4.1 | 89.5 | 2.96 |
| 15 | 3.0 | 89.0 | 2.0 |
| 16 | 4.5 | 88.3 | 7.2 |
| 17 | 3.5 | 90.0 | 2.7 |
| 18 | 4.6 | 88.7 | 10.2 |

We claim:

1. A transparent ignition resistant polymeric composition which comprises
   (A) a carbonate polymer, and
   (B) a polyether polyol metal salt complex in an amount effective to give a significant increase in ignition resistance
   wherein said metal salt comprises a halogen containing anion, and a metal cation wherein the metal is an alkali or alkaline earth metal and wherein said polyol has a molecular weight greater than 800.

2. The composition of claim 1 wherein the amount of said complex is 0.0001 to 10 percent by weight based on said carbonate polymer.

3. The composition of claim 1 wherein said polyol is a block or random copolymer derived from alkylene oxides of 2 to 4 carbon atoms having a weight average molecular weight in the range from about 1000 to about 50,000.

4. The composition of claim 1 wherein said polyol is a homopolymer of alkylene oxides of 2 to 3 carbon atoms having a weight average molecular weight in the range from about 1000 to about 10,000.

5. The composition of claim 1 wherein said metal salt is a sodium or potassium halide.

6. The composition of claim 5 wherein said metal salt is potassium bromide.

7. The composition of claim 5 wherein said metal salt is sodium bromide.

8. A transparent ignition resistant polymeric composition which comprises
   (A) A carbonate polymer, and
   (B) About 0.005 to about 2 weight percent based on said polymer of a polyether polyol metal salt complex wherein said polyol is made from ethylene oxide and has a molecular weight range from about 6,000 to about 10,000, and wherein said salt is sodium or potassium halide.

9. The composition of claim 8 wherein said metal salt is potassium bromide.

10. The composition of claim 8 wherein said metal salt is sodium bromide.

11. The composition of claim 1 which has in addition an effective amount of a monomeric or polymeric halogenated aromatic compound.

12. The composition of claim 11 wherein the amount of said aromatic compound is such that the final aromatic halogen content in said composition is in the range from 0.01 to 10 percent by weight.

13. The composition of claim 11 wherein said polyol is a block or random copolymer derived from alkylene oxides of 2 to 4 carbon atoms having a weight average molecular weight in the range from about 1000 to about 50,000.

14. The composition of claim 11 wherein said polyol is a homopolymer of alkylene oxides of 2 to 3 carbon atoms having a weight average molecular weight in the range from about 1000 to about 10,000.

15. The composition of claim 11 wherein said metal salt is a sodium or potassium halide.

16. The composition of claim 15 wherein said metal salt is potassium bromide.

17. The composition of claim 15 wherein said metal salt is sodium bromide.

18. An ignition resistant polymeric composition which comprises
    (A) A carbonate polymer,
    (B) About 0.005 to 2 weight percent based on said polymer of a polyether polyol metal salt complex wherein said polyol is made from ethylene oxide and has a molecular weight range from about 6,000 to about 10,000, wherein said salt is sodium or potassium halide, and
    (C) About 0.1 to about 1.0 weight percent based on said polymer of a polybrominated polycarbonate.

19. The composition of claim 18 wherein said metal salt is potassium bromide.

20. The composition of claim 18 wherein said metal salt is sodium bromide.

* * * * *

UNITED STATES PATENT AND TRADEMARK OFFICE
CERTIFICATE OF CORRECTION

PATENT NO. : 4,587,310

DATED : May 6, 1986

INVENTOR(S) : Samual A. Ogoe and Kevin F. Dick

It is certified that error appears in the above-identified patent and that said Letters Patent is hereby corrected as shown below:

In the "Title", section [54], line 1; change "POLYMES" to --POLYMERS--.

Col. 1, line 2; change "POLYMES" to --POLYMERS--.

Col. 5, Table III-continued, line 15, under heading "# Drips"; change "0.5" to --0/5--.

Signed and Sealed this

First Day of September, 1987

Attest:

DONALD J. QUIGG

Attesting Officer

Commissioner of Patents and Trademarks